US012636971B1

(12) United States Patent　　　(10) Patent No.:　US 12,636,971 B1

Logvinov　　　(45) **Date of Patent:　*May 26, 2026**

(54) METHODS, DEVICES, AND SYSTEM UTILIZING ELECTRIC VEHICLE CHARGERS FOR BIDIRECTIONAL CHARGING

(71) Applicant: IoTecha Corp., Cranbury, NJ (US)

(72) Inventor: Oleg Logvinov, Asbury, NJ (US)

(73) Assignee: IoTecha Corp., Cranbury, NJ (US)

( * ) Notice: Subject to any disclaimer, the term of this patent is extended or adjusted under 35 U.S.C. 154(b) by 959 days.

This patent is subject to a terminal disclaimer.

(21) Appl. No.: 17/446,118

(22) Filed: Aug. 26, 2021

Related U.S. Application Data

(60) Provisional application No. 63/103,848, filed on Aug. 26, 2020.

(51) Int. Cl.
| | |
|---|---|
| *B60L 55/00* | (2019.01) |
| *B60L 53/16* | (2019.01) |
| *B60L 53/30* | (2019.01) |
| *B60L 53/62* | (2019.01) |

(Continued)

(52) U.S. Cl.
CPC .............. B60L 55/00 (2019.02); B60L 53/16 (2019.02); B60L 53/305 (2019.02); B60L 53/62 (2019.02); B60L 58/12 (2019.02); H02J 3/322 (2020.01); B60L 2210/40 (2013.01); H02J 2203/10 (2020.01); H02J 2310/12 (2020.01)

(58) Field of Classification Search
CPC ...................................................... B60L 53/16
See application file for complete search history.

(56) References Cited

U.S. PATENT DOCUMENTS

| | | | |
|---|---|---|---|
| 6,172,432 B1 * | 1/2001 | Schnackenberg ....... | H02J 9/066 |
| | | | 307/64 |
| 8,143,856 B2 * | 3/2012 | Andrea ................. | H02M 7/797 |
| | | | 320/109 |
| 9,559,521 B1 * | 1/2017 | King ........................ | H02J 9/06 |

(Continued)

OTHER PUBLICATIONS

Nissan Motor Co., Ltd.: Presentation "LEAF to Home", Jul. 11, 2012, 10 pages.

(Continued)

*Primary Examiner* — Tynese V McDaniel
(74) *Attorney, Agent, or Firm* — NK Patent Law

(57) ABSTRACT

Bidirectional electric vehicle (EV) chargers for Combined Charging system (CCS) compatible EVs implementing alternating current (AC) charging for an EV and direct current (DC) discharging of the EV for providing backup power are disclosed. In one embodiment, a bidirectional EV charger includes a power input interface, a power output interface, and an EV charging interface configured to be electrically coupled with an EV charging port of an EV. The bidirectional EV charger further includes EV charging circuitry electrically coupled between with the power input interface and the EV charging interface; EV discharging circuitry electrically coupled between with the EV charging interface and the power output interface; and a controller electrically coupled with the EV charging circuitry and the EV discharging circuitry. The controller is configured for operating the bidirectional EV charger in a manner compliant to at least one version of the International Electrotechnical Commission (IEC) 62196 standard.

9 Claims, 5 Drawing Sheets

(51) Int. Cl.
  B60L 58/12 (2019.01)
  H02J 3/32 (2026.01)

(56) References Cited

U.S. PATENT DOCUMENTS

| | | | |
|---|---|---|---|
| 10,759,287 B2 | 9/2020 | Vahedi et al. | |
| 10,938,211 B2 | 3/2021 | Bell | |
| 2002/0060499 A1* | 5/2002 | Wilhelm | H02J 7/02 |
| | | | 307/72 |
| 2010/0133900 A1* | 6/2010 | King | B60L 58/40 |
| | | | 180/65.21 |
| 2012/0074777 A1* | 3/2012 | Sugiyama | B60L 50/51 |
| | | | 307/22 |
| 2012/0169511 A1* | 7/2012 | Windstrup | B60L 53/64 |
| | | | 340/870.02 |
| 2012/0170342 A1* | 7/2012 | Manning | G06F 1/26 |
| | | | 29/401.1 |
| 2014/0062401 A1* | 3/2014 | Gadh | B60L 53/67 |
| | | | 320/109 |
| 2015/0015188 A1* | 1/2015 | Ono | H02J 3/322 |
| | | | 320/107 |
| 2016/0221456 A1* | 8/2016 | Rhodes | B60L 15/2045 |
| 2016/0241032 A1* | 8/2016 | Zimmanck | G05B 15/02 |
| 2018/0123348 A1* | 5/2018 | Narla | H02J 7/35 |
| 2020/0031238 A1* | 1/2020 | Kydd | H02J 9/062 |

OTHER PUBLICATIONS

Nissan Annual Report 2012: "Nissan's Electric Vehicle History", 1 page.
DCBEL: "Your Home EV Supercharger Featuring blackout power and solar charging. For North America", 02-2020/V01.1/ENG., 5 pages.
Igor Cvetkovic et al.: "Future Home Uninterruptible Renewable Energy System with Vehicle-to-Grid Technology", IEEE Xplore, Conference Paper, Oct. 2009, 8 pages.
David P. Tuttle et al.: "Plug-In Vehicle to Home (V2H) Duration and Power Output Capability", IEEE, 2013, 7 pages.

* cited by examiner

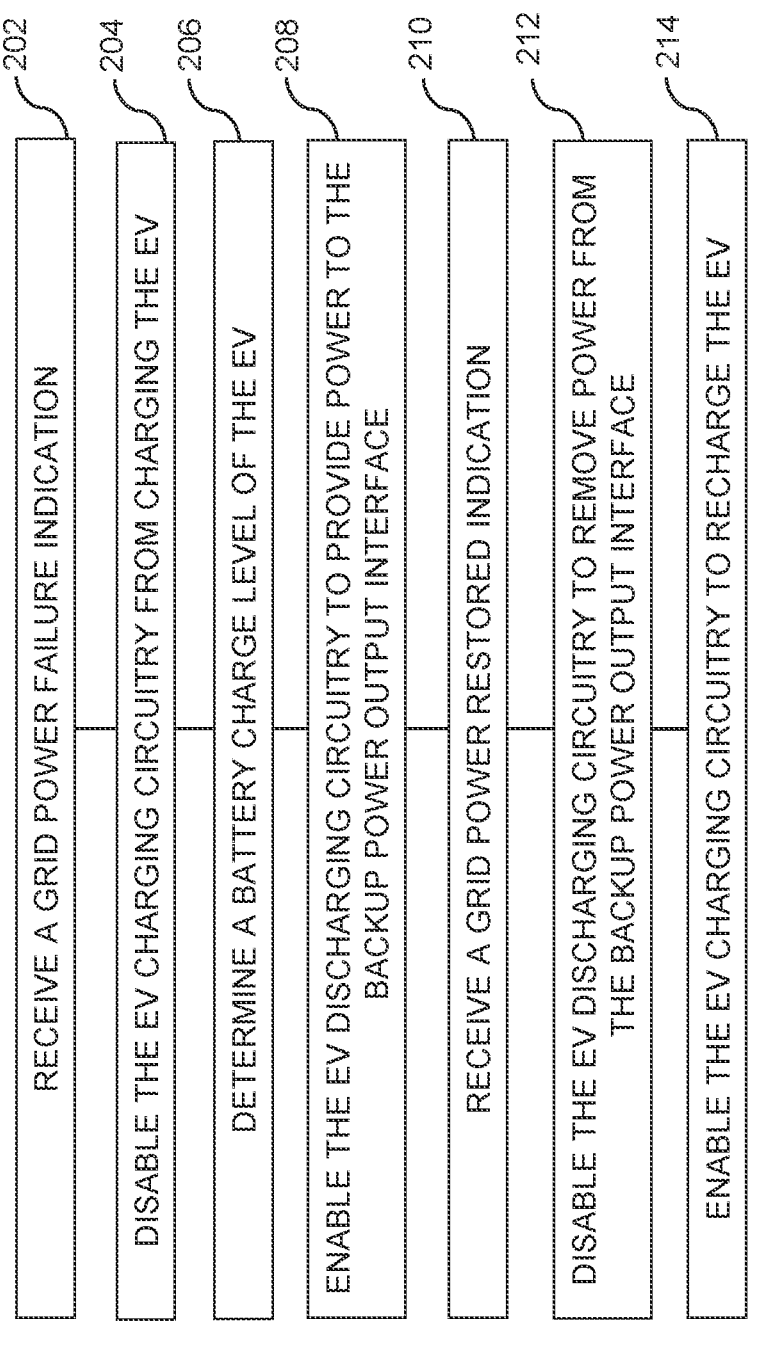

FLOW CHART
200

RECEIVE A GRID POWER FAILURE INDICATION — 202

DISABLE THE EV CHARGING CIRCUITRY FROM CHARGING THE EV — 204

DETERMINE A BATTERY CHARGE LEVEL OF THE EV — 206

ENABLE THE EV DISCHARGING CIRCUITRY TO PROVIDE POWER TO THE BACKUP POWER OUTPUT INTERFACE — 208

RECEIVE A GRID POWER RESTORED INDICATION — 210

DISABLE THE EV DISCHARGING CIRCUITRY TO REMOVE POWER FROM THE BACKUP POWER OUTPUT INTERFACE — 212

ENABLE THE EV CHARGING CIRCUITRY TO RECHARGE THE EV — 214

FIG. 2

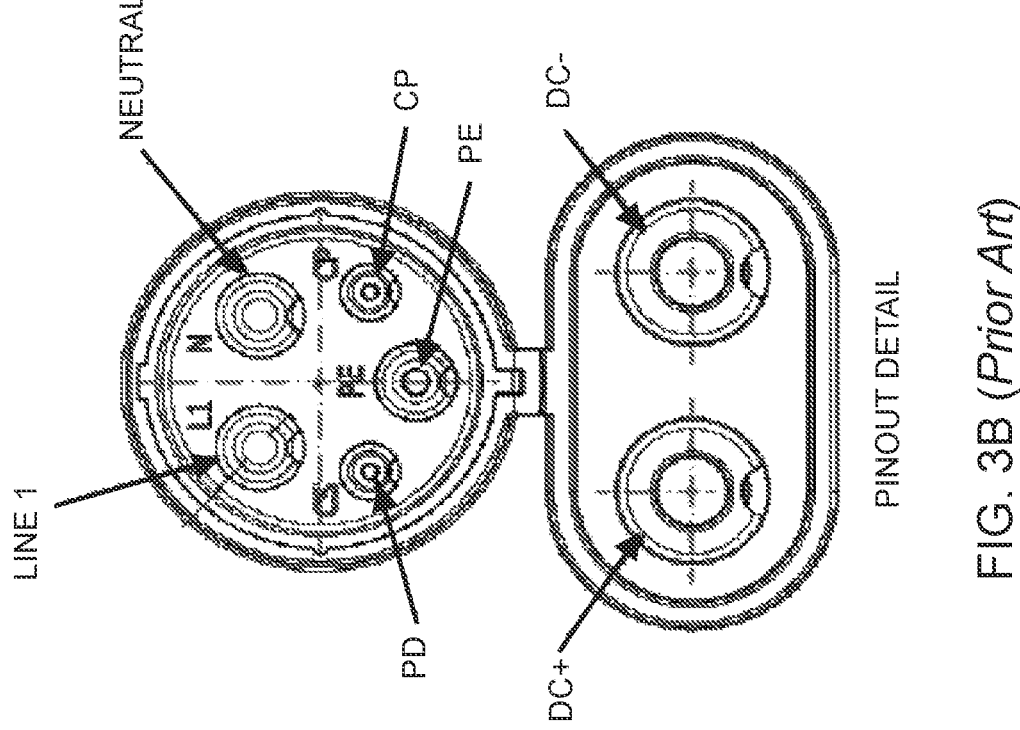
NEUTRAL
CP
PE
DC-
LINE 1
N
PE
L1
PD
DC+
PINOUT DETAIL
FIG. 3B (*Prior Art*)
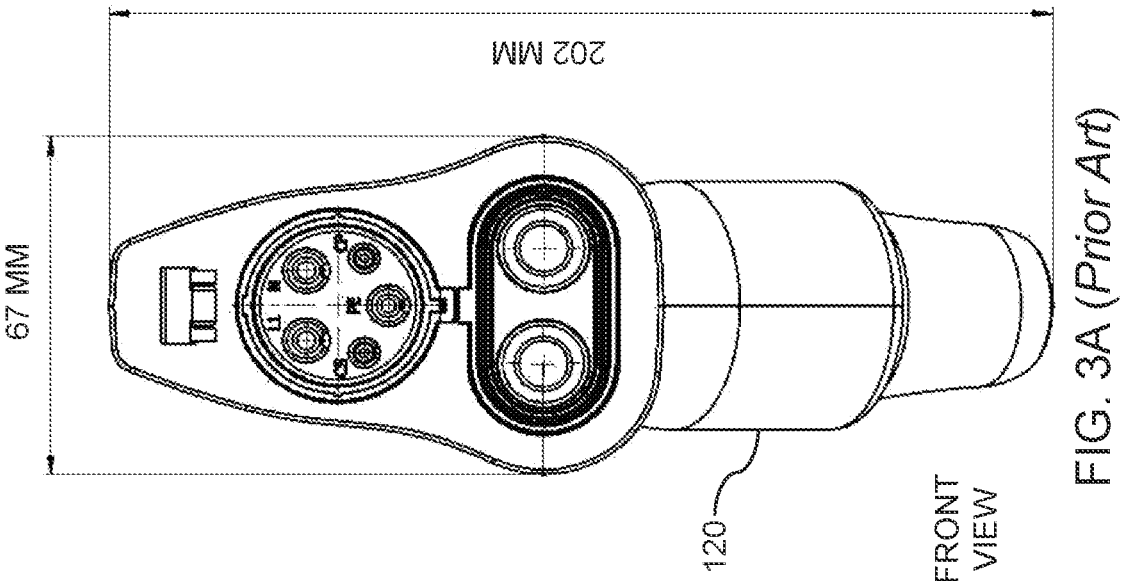
202 MM
67 MM
N
PE
L1
120
FRONT VIEW
FIG. 3A (*Prior Art*)

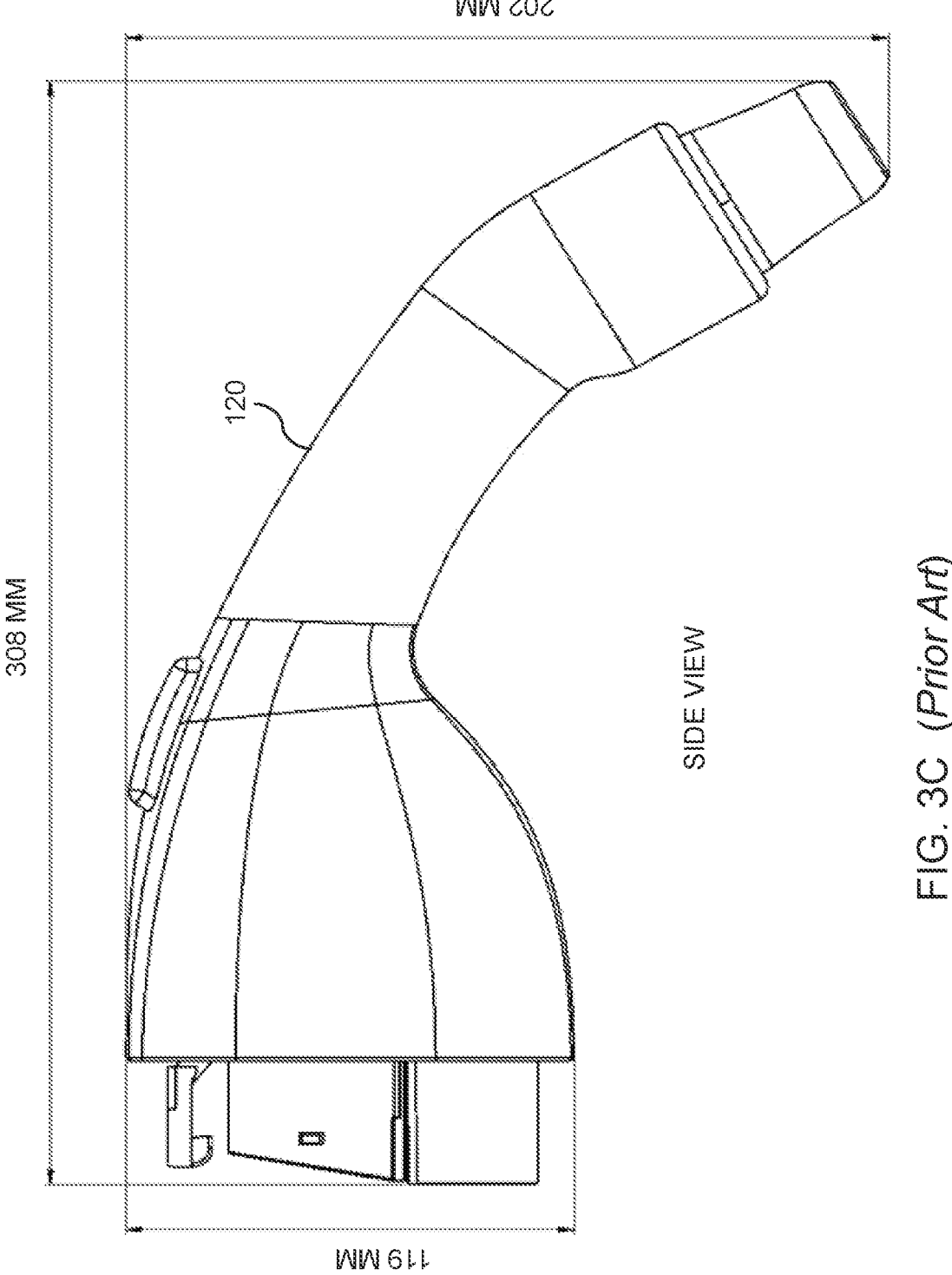
SIDE VIEW
FIG. 3C *(Prior Art)*

METHODS, DEVICES, AND SYSTEM UTILIZING ELECTRIC VEHICLE CHARGERS FOR BIDIRECTIONAL CHARGING

PRIORITY CLAIM

This application claims priority to U.S. Provisional Patent Application Ser. No. 63/103,848 filed Aug. 26, 2020, the disclosure of which is incorporated herein by reference in its entirety.

TECHNICAL FIELD

The present invention relates generally to the field of electric vehicle (EV) chargers. More particularly, methods, devices, and systems are disclosed for EV chargers providing bidirectional power conversion and charging.

BACKGROUND

With the growth of electric vehicles (EVs), users are installing home based EV chargers for convenience. In general, each kilowatt-hour (kWh) from an EV charger provides about four miles of driving range for an EV. Level 1 EV chargers use 120 volts alternating current (VAC) and can provide approximately 1.3 kW to 2.4 kW to an EV. Level 2 chargers require 208-240 VAC and can provide up to 19.2 kW from a 80 amp source. An EV battery pack may store anywhere from 18 kWh to 100 kWh depending on the model EV and range.

In contrast, a typical 2000 square foot residence may use 1000 kWh per month. This level of usage correlates to an average household power draw of 1.4 kW. As such, an EV battery pack storing only 20 kWh and coupled with a power converter having an efficiency of only 80%, could easily supply eleven or more hours of backup power for the residence. With power shedding of certain appliances (e.g. air conditioners, water pumps, etc.) the time could be increased. Additionally, with the faster charging capabilities of Level 2 EV chargers, the EV may be more often charged and available to provide backup power at any given time.

Accordingly, there remains a need for methods, devices, and systems for providing backup power for residential application using EV batteries.

SUMMARY

Disclosed herein are methods, devices, and systems, including electric vehicle (EV) chargers providing bidirectional power conversion and charging.

According to one embodiment, a bidirectional electric vehicle (EV) charger for Combined Charging system (CCS) compatible EVs implementing alternating current (AC) charging for an EV and direct current (DC) discharging of the EV for providing backup power is disclosed. The bidirectional EV charger includes a power input interface, a power output interface, and an EV charging interface configured to be electrically coupled with an EV charging port of an EV. The bidirectional EV charger further includes EV charging circuitry electrically coupled between with the power input interface and the EV charging interface; EV discharging circuitry electrically coupled between with the EV charging interface and the power output interface; and a controller electrically coupled with the EV charging circuitry and the EV discharging circuitry. The controller is configured for operating the bidirectional EV charger in a manner compliant to at least one version of the International Electrotechnical Commission (IEC) 62196 standard.

In some embodiments, the power output interface may be configured to interface with an external DC-to-AC inverter.

In some embodiments, the external DC-to-AC inverter may be configured to supply split-phase power comprising a neutral conductor, a first live conductor configured to supply 120 volt AC (VAC) relative to the neutral conductor, and a second live conductor configured to supply 120 VAC relative to the neutral conductor and be approximately 180 degrees out-of-phase from the first live conductor.

In some embodiments, the EV discharging circuitry may include a DC-to-AC inverter.

In some embodiments, the power output interface may be configured to be electrically coupled with a transfer switch.

In some embodiments, the power output interface may be configured to supply split-phase power comprising a neutral conductor, a first live conductor configured to supply 120 volt AC (VAC) relative to the neutral conductor, and a second live conductor configured to supply 120 VAC relative to the neutral conductor and be approximately 180 degrees out-of-phase from the first live conductor.

In some embodiments, the power output interface may be compliant to a NEMA L14-30R female locking receptacle.

In some embodiments, the controller may be further configured for implementing Pilot Line management for a charging session and a discharging session without disconnection of the EV charging interface from the EV.

In some embodiments, the power input interface may be compliant to at least one a NEMA L14-30P plug and a NEMA L14-50P plug.

In some embodiments, the bidirectional EV charger may further include a user interface. The user interface may be configured for allowing a user to enable the EV discharging circuitry to provide power to the power output interface based on a battery charge level of the EV and allowing the user to disable the EV discharging circuitry to remove power to the power output interface.

In some embodiments, the controller may be further configured for receiving a grid power failure indication, determining a battery charge level of the EV, and enabling the EV discharging circuitry to provide power to the power output interface.

In some embodiments, the controller may be further configured for receiving a grid power restored indication and disabling the EV discharging circuitry.

In some embodiments, the grid power failure indication may be determined from a loss of power at the power input interface and the grid power restored indication may be determined from a return of power at the power input interface.

In some embodiments, the bidirectional EV charger may further include a communication interface electrically coupled with the controller. The controller may be further configured for receiving the grid power failure indication and the grid power restored indication from the communication interface.

In some embodiments, the communication interface may be electrically coupled with at least two contacts of a power fail relay of a transfer switch.

In some embodiments, the communication interface may be configured to provide a remaining power indication based on the battery charge level of the EV.

In some embodiments, a transfer switch may be configured to receive the remaining power indication and provide load management based on the remaining power indication.

In some embodiments, the transfer switch may be embedded within the bidirectional EV charger.

In some embodiments, the communication interface includes an Internet Protocol (IP) network interface configured to send status information to a remote computing device and receive commands from the remote computing device.

According to another embodiment, a bidirectional EV charger implements direct current (DC) to alternating current (AC) power conversion for backup power. The bidirectional EV charger includes a power input interface, EV charging circuitry electrically coupled with the power input interface, an EV charging interface configured to be electrically coupled with an EV charging port of an EV, a DC-to-AC inverter electrically coupled with the EV charging interface, and a backup power output interface electrically coupled with the DC-to-AC inverter. The EV charging circuitry may provide AC power to the EV charging interface. The EV charging circuitry may include switch circuitry for enabling and/or disabling AC power to the EV charging interface. The EV charging circuitry may include an AC-to-DC rectifier for providing DC power to the EV charging interface.

In some embodiments, the backup power output interface may be configured to supply split-phase power. The split phase power may include a neutral conductor, a first live conductor configured to supply 120 volt AC (VAC) relative to the neutral conductor, and a second live conductor configured to supply 120 VAC relative to the neutral conductor and be approximately 180 degrees out-of-phase from the first live conductor.

In other embodiments, the backup power output interface may be configured to supply three-phase power. The three phase power may include a neutral conductor, a first live conductor configured to supply 120 volt VAC relative to the neutral conductor, a second live conductor configured to supply 120 VAC relative to the neutral conductor and be approximately 120 degrees out-of-phase from the first live conductor, and a third live conductor configured to supply 120 VAC relative to the neutral conductor and be approximately 120 degrees out-of-phase from the first live conductor and the second live conductor.

In some embodiments, the backup power output interface may be compliant to a NEMA L14-30R female locking receptacle or the like.

In some embodiments, the power input interface may be compliant to a NEMA L14-30P plug, a NEMA L14-50P plug, or the like.

In some embodiments, the backup power output interface may be configured to be electrically coupled with a transfer switch.

In some embodiments, the bidirectional EV charger may further include a user interface. The user interface may be configured for allowing a user to enable the DC-to-AC inverter to provide power to the backup power output interface based on a battery charge level of the EV. The user interface may be further configured for allowing the user to disable the DC-to-AC inverter to remove power to the backup power output interface.

In some embodiments, the bidirectional EV charger may further include a controller electrically coupled with the EV charging circuitry and the DC-to-AC inverter. The controller may be configured for receiving a grid power failure indication, determining a battery charge level of the EV, and enabling the DC-to-AC inverter to provide power to the backup power output interface.

In some embodiments, the controller may be further configured for receiving a grid power restored indication and disabling the DC-to-AC inverter.

In some embodiments, the grid power failure indication may be determined from a loss of power at the power input interface and the grid power restored indication may be determined from a return of power at the power input interface.

In some embodiments, the bidirectional EV charger may further include a communication interface electrically coupled with the controller. The controller may be further configured for receiving the grid power failure indication and the grid power restored indication from the communication interface.

In some embodiments, the transfer switch may include a power fail relay and the communication interface may be electrically coupled with at least two contacts of the power fail relay.

In some embodiments, the communication interface may be configured to provide a remaining power indication based on the battery charge level of the EV.

In some embodiments, the transfer switch may be configured to receive the remaining power indication and provide load management based on the remaining power indication.

In some embodiments, the transfer switch may be embedded within the bidirectional EV charger.

In some embodiments, the communication interface may include an Internet Protocol (IP) network interface configured to send status information and receive commands from a remote computing device.

In some embodiments, remote computing device may be a mobile computing device having graphical user interface (GUI) and an application for receiving the status information and sending the commands.

In some embodiments, the status information may include load management information.

In some embodiments, the IP network interface may be provided by a cellular interface and configured to communicate with the remote computing device when the grid power is unavailable.

In another embodiment, a device implementing DC-to-AC power conversion for residential backup power and EV charging is disclosed. The device includes an EV charging interface configured to be electrically coupled with an EV charging port of an EV, EV charging circuitry electrically coupled with the EV charging interface, a transfer switch configured to be wired to a residential breaker panel; and a DC-to-AC inverter electrically coupled with the EV charging interface and the transfer switch. The device is configured for operating in a first mode to charge a battery pack of the EV using the EV charging circuitry. The device is further configured for operating is a second mode to provide backup power to the residential breaker panel.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 2 depicts a flow chart illustrating a method implemented by the controller of FIG. 1 in accordance with embodiments of the present disclosure.

FIG. 3A depicts a mechanical diagram illustrating a front view of a Combined Charging System (CCS) Type 1 plug in accordance with embodiments of the present disclosure.

FIG. 3B depicts a mechanical diagram illustrating a pinout detail of the CCS Type 1 plug of FIG. 3A in accordance with embodiments of the present disclosure.

FIG. 3C depicts a mechanical diagram illustrating a side view of the CCS Type 1 plug of FIG. 3A in accordance with embodiments of the present disclosure.

DETAILED DESCRIPTION

Figure 1:
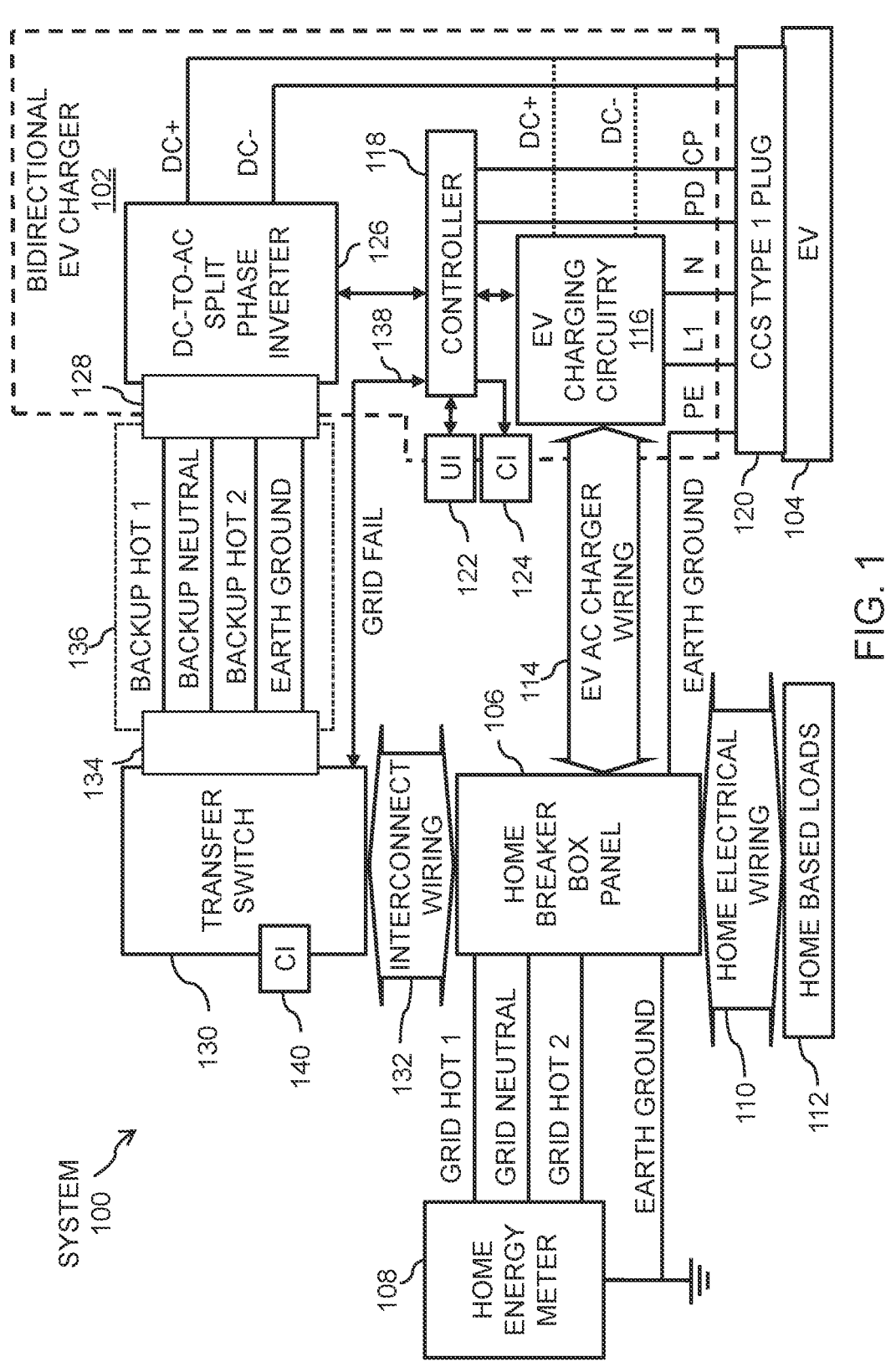
FIG. 1 depicts a block diagram illustrating a system that includes a bidirectional electric vehicle charger having a controller in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, systems, and devices for electric vehicle (EV) chargers providing bidirectional power conversion and charging using both alternating current (AC) and direct current (DC) interfaces. A first mode of operation is provided for EV charging using grid based power. A second mode of operation is provided for residential backup power using EV battery packs (e.g. a DC-to-AC conversion path). Under both modes of operation the same EV power connection is used. Additionally, a standard type transfer switch and wiring arrangement may be used.

FIG. 1 depicts a block diagram illustrating a system 100 that includes bidirectional power conversion in accordance with embodiments of the present disclosure. The system includes a bidirectional EV charger 102, an EV 104, a home breaker box panel 106, a home energy meter 108, home electrical wiring 110, and home based loads 112. The home breaker box panel 106 is electrically coupled with the home energy meter 108 via grid conductors including Grid Hot 1, Grid Hot 2, and Grid Neutral as a split-phase grid connection as is commonly known in the art. The home breaker box panel 106 is electrically coupled with the home based loads 112 via the home electrical wiring 110 as is commonly known in the art. (I.E. The home electrical wiring 110 is compliant to at least one version the National Electrical Code.)

The home breaker box panel 106 is electrically coupled with the bidirectional EV charger 102 with EV AC charger wiring 114. The EV AC charger wiring 114 may provide split-phase power to EV charging circuitry 116 embedded within the bidirectional EV charger 102. In certain embodiments the EV AC charger wiring 114 is configured for a maximum of 30 amps. In other embodiments the EV AC charger wiring 114 is configured for a maximum of 50 amps. The EV AC charger wiring 114 may include a NEMA L14-30P plug, a NEMA L14-50P plug, or the like. The EV charging circuitry 116 is configured to charge a battery pack of the EV 104. The bidirectional EV charger 102 also includes a controller 118 electrically coupled with the EV charging circuitry 116.

The controller 118 is further electrically coupled with a Combined Charging System (CCS) Type 1 plug 120 coupled with a charging port of the EV 104. The controller 118 is configured to monitor a Proximity Detection (PD) contact to confirm connection to the EV 104. The controller 118 is further configured to monitor a control pilot (CP) contact to maintain a charging rate within a safe operating limit of the EV 104. The EV charging circuitry is configured to provide AC power to the CCS Type 1 plug 120. The EV charging circuitry includes switch circuitry for enabling and/or disabling AC power to the CCS Type 1 plug 120 via a first AC (L1) contact and a second AC (N) contact. The L1 contact and the N contact provide AC power to internal charging circuitry within the EV. The switch circuitry may include a relay and the relay may be a solid state relay. The EV charging circuitry may also include an AC-to-DC rectifier for providing DC power to the EV charging interface via a DC+ contact and a DC− contact. The DC+ contact and the DC− contact provide charging current to the battery pack of the EV 104 in this scenario. A protective earth (PE) contact of the CCS Type 1 plug 120 is electrically coupled with earth ground provided by the home breaker box panel 106.

The controller is further electrically coupled with a user interface (UI) 122 and communication interface (CI) 124. The user interface 122 may include one or more switches and one or more indicators. In some embodiments the user interface 122 may include a touch pad display. The UI 122 may include a switch for changing from an EV charging mode to a home power back up mode and back again. The UI 122 may also include a display indicating a current load in amps and/or watts of the home based loads 112 and a current charge status of the EV 104.

The communication interface 124 may include an Ethernet interface for connection to an Internet Protocol (IP) network. The communication interface 124 may also include one or more radios to connect to a wireless local area network (WLAN) using one or more Wi-Fi technologies (e.g. 802.11a, 802.11b/g/n, 802.11ac, and/or the like). The communication interface 124 may also include one or more radios to connect to a wide area network (WAN) via one or more cellular technologies. The cellular technologies may include 2G, 3G, 4G, and/or 5G technologies. The communication interface 124 may also include one or more radios to connect to a wireless personal area network (WPAN). In certain embodiments, the WPAN may be compliant to at least one version of the Bluetooth® communication standard.

The communication interface 124 may be configured to communicate with a remote computing device (not shown in FIG. 1). The remote computing device may be a personal computer (PC) and/or a remote server (e.g. cloud based server). The remote computing device may be a mobile computing device such as a smart phone, a smart tablet, a smart watch, or the like.

The controller 118 includes a processor and memory (not shown in FIG. 1). The memory may include a combination of volatile memory (e.g. random access memory) and non-volatile memory (e.g. flash memory). The memory may be partially integrated with the processor. Additionally, the controller 118 includes a plurality of analog-to-digital converters (ADCs) and a plurality of digital-to-analog convertors (DACs). In some embodiments the controller, may include an application processor such as an NXP® i.MX 6Quad Core central processing unit (CPU). In still further embodiments, the controller 118 may be a Vector Supply Equipment Communication Controller (vSECC) optimized for Level 2 charging stations.

The bidirectional EV charger 102 also includes a DC-to-AC split phase inverter 126 electrically coupled with the controller 118 and the DC+ and DC− contacts of the CCS type 1 plug 120. The DC-to-AC split phase inverter 126 is configured to supply split phase backup power via a receptacle 128. The receptacle 128 may be a NEMA L14-30R female locking receptacle or the like. The DC-to-AC split phase inverter 126 may have an efficiency rating greater than 90 percent.

The system 100 also includes a transfer switch 130 electrically coupled with the home breaker box panel 106 via interconnect wiring 132. The transfer switch 130 is a standard off-the-shelf (OTS) transfer switch. The interconnect wiring 132 is implemented in a standard configuration as known in the art. The transfer switch 130 and interconnect wiring 132 may be configured to bypass individual circuits/breakers within the home breaker box panel 106 and/or perform a complete transfer of power. The transfer switch 130 includes connector 134 configured to receive backup power from the bidirectional EV charger 102 via cable 136 including Backup Hot 1, Backup Hot 2, Backup Neutral, and earth ground. The connector 134 may be a NEMA 3R power inlet as found on many residential transfer switches allowing easy connection to a portable generator. However, the bidirectional EV charger 102 replaces the need for the portable generator when the EV 104 is available and charged to some acceptable capacity. Basically, a typical L14-30 generator power cord may be used for cable 136.

The transfer switch 130 may be configured to generate a grid fail signal to the bidirectional EV charger 102 and then switch to backup power. In other embodiments, the transfer switch 130 may be configured to receive the grid fail signal from the bidirectional EV charger 102 and switch to backup power upon receiving the grid fail signal. Basically, the EV charging circuitry 116 may signal the controller 118 when power is absent from the EV AC charger wiring 114. In this scenario EV AC charger wiring 114 must be implemented such that the transfer switch 130 cannot provide backup power to the EV charging circuitry 116.

In other embodiments, the transfer switch 130 may be a manual transfer switch requiring a user (e.g. home owner) to manually switch to backup power. Additionally, the user may be required to manually activate the DC-to-AC split phase inverter 126 via the user interface 122. The transfer switch 130 may switch all the home based loads 112 and/or switch individual circuits (i.e. circuit breakers) based on a current load capacity.

In certain embodiments, the transfer switch 130 may be a smart transfer switch with communication interface (CI) 140. The communication interface 140 may be similar to the communication interface 122 of the bidirectional EC charger 102 and communicate over the IP network sending status information and receiving control information.

The bidirectional EV charger 102 may also have its own internal battery (not shown in FIG. 1) to allow smooth functioning of the controller 118 during transitions of the system 100 from grid power to backup power provided by the EV 104 and the DC-to-AC split phase inverter 126. The internal battery may have its own charger (not shown in FIG. 1) and be capable of either being charged from the EV AC charger wiring 114 or from the EV 104.

In another embodiment of the system 100 of FIG. 1, the transfer switch 130 may be included within the bidirectional EV charger 102. In this scenario the receptacle 128, connector 134, cable 136, and communication interface 140 would not be needed. In still another embodiment, the DC-to-AC split phase inverter 126 may be external to the bidirectional EV charger 102. The DC-to-AC split phase inverter 126 may be an OTS standard model inverter.

FIG. 2 depicts a flow chart 200 illustrating a method implemented by the controller 118 of FIG. 1 in accordance with embodiments of the present disclosure.

In step 202, the controller 118 receives a grid power failure indication. The grid power failure indication may be provided by a relay contact closure or opening on the transfer switch. The grid power failure indication may also come from within the bidirectional EV charger 102. For example the EV charging circuitry 116 may signal the processor 118 that power is no longer being received from the EV AC charger wiring 114.

In step 204, (if needed) the controller 118 disables the EV charging circuitry 116 from charging the EV 104

In step 206, the controller 118 determines a battery charge level of the EV 104.

In step 208, the controller 118 enables the EV discharging circuitry (e.g. the DC-to-AC split phase inverter 126) to provide power to the backup power output interface 128 if the battery charge level of step 206 was determined to be at an acceptable capacity. In certain embodiments, the controller 118 may signal the transfer switch 130 to switch one or more of the home based loads 112 to the backup power output interface 128.

In step 210, the controller 118 receives a grid power restore indication. The grid power restore indication is received in a similar manned to the grid power failure indication of step 202.

In step 212, the controller 118 disables the EV discharging circuitry (e.g. the DC-to-AC split phase inverter 126) to remove power from the backup power output interface 128. In certain embodiments, the controller 118 may signal the transfer switch 130 to switch one or more of the home based loads 112 back to the grid power.

In step 214, the controller 118 enables the EV charging circuitry 116 to begin re-charging the battery pack of the EV 104.

FIG. 3A depicts a mechanical diagram illustrating a front view of the CCS Type 1 plug 120 of the bidirectional EV charger 102 of FIG. 1 in accordance with embodiments of the present disclosure. The CCS Type 1 plug 120 is a standard for DC charging for EVs in North America. The CCS Type 1 plug 120 has a width of approximately 67 millimeters (mm) and has a height of approximately 202 mm.

FIG. 3B depicts a mechanical diagram illustrating a pinout detail of the CCS Type 1 plug 120 of FIG. 3A in accordance with embodiments of the present disclosure. The locations of the L1, N, PE, PD, CP, DC+, and DC− contacts (describer in FIG. 1) are shown.

FIG. 3C depicts a mechanical diagram illustrating a side view of the CCS Type 1 plug of FIG. 3A in accordance with embodiments of the present disclosure. The CCS Type 1 plug 120 has a depth of approximately 308 millimeters (mm) and the connector face has a height of approximately 119 mm.

Figure 4:
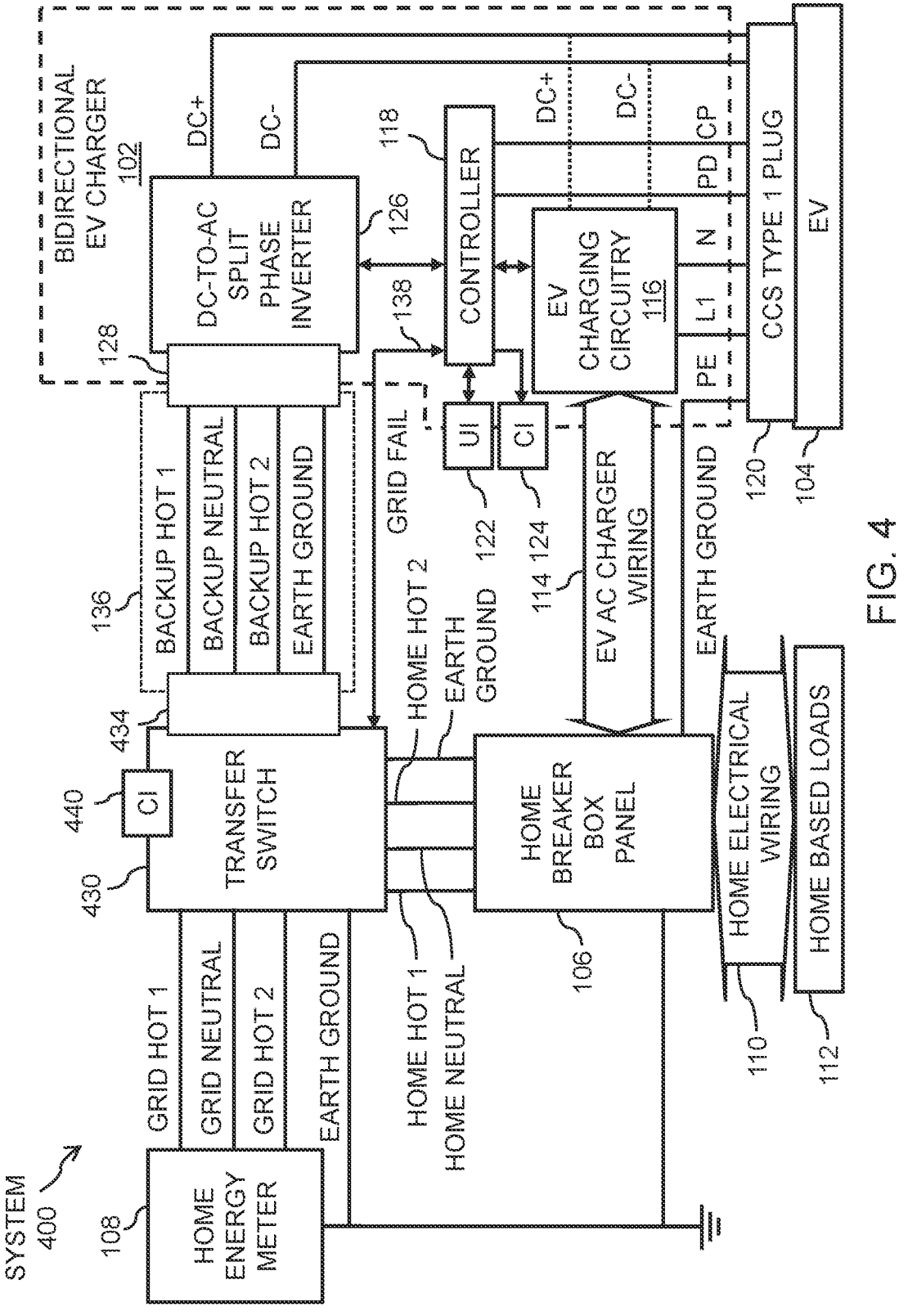
FIG. 4 depicts a block diagram illustrating another system that includes the bidirectional electric vehicle charger of FIG. 1 in accordance with embodiments of the present disclosure.

FIG. 4 depicts a block diagram illustrating another system 400 that includes the bidirectional electric vehicle charger 102 of FIG. 1 in accordance with embodiments of the present disclosure. The transfer switch 130 of FIG. 1 is replaced with a transfer switch 430 wired between the home energy meter 108 and the home breaker box panel 106 to provide a complete power transfer to the home based loads 112. The transfer switch 430 includes a connector 434 configured to receive backup power from the bidirectional EV charger 102 via cable 326 including Backup Hot 1, Backup Hot 2, Backup Neutral, and earth ground. The connector 434 may also be a NEMA 3R power inlet. The transfer switch 430 may use a single double pole double throw (DPDT) relay configured for automatic transfer and/or a DPDT switch for manual transfer. The transfer switch may also include a communication interface (CI) 440 configured in a similar manner to the communication interface 140 of FIG. 1. The system 400 operates in a similar manner as described in the flowchart 200 of FIG. 2. In another embodiment of the system 400 of FIG. 4, the transfer switch 430 may be included within the bidirectional EV charger 102. In this scenario the receptacle 128, connector 434, cable 136, and communication interface 440 would not be needed. In still another embodiment, the DC-to-AC split phase inverter 126 may be external to the bidirectional EV charger 102. The DC-to-AC split phase inverter 126 may be an OTS standard model.

In summary, methods, devices, and systems for electric vehicle (EV) chargers providing bidirectional power conversion and charging have been disclosed herein. As a first example, a MINI Cooper SE (model year 2022) has a battery pack capacity of 32.6 kWh. With a 90 percent efficiency of the DC-to-AC spit phase inverter 126 and an average household power draw of 1.4 kW, the MINI Cooper SE may provide 21 hours of backup power. This is longer than a typical portable generator can run on one tank of fuel. Additionally, the average power outage in the United States is less than two hours. In a second example, a Tesla Model S Plaid (model year 2022) has a battery pack capacity of 100 kWh and may provide over two days of backup power.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A bidirectional electric vehicle (EV) charger for Combined Charging system (CCS) compatible EVs implementing alternating current (AC) charging for an EV and direct current (DC) discharging of the EV for providing complete power transfer for home based loads, the bidirectional EV charger comprising:

a CCS EV charging interface having AC contacts and DC contacts, wherein the CCS EV charging interface is configured to be electrically coupled with an EV charging port of the EV;

a transfer switch configured to provide load management based on a battery charge level of the EV;

a home energy meter interface electrically coupled with the transfer switch;

a home breaker box panel interface electrically coupled with the transfer switch;

a DC-to-AC split phase inverter electrically coupled between the DC contacts of the EV charging interface and the transfer switch, wherein the DC-to-AC split phase inverter is configured to supply split-phase power comprising:

a neutral conductor;

a first live conductor configured to supply 120 volt AC (VAC) relative to the neutral conductor; and a second live conductor configured to supply 120 VAC relative to the neutral conductor and be approximately 180 degrees out-of-phase from the first live conductor;

EV charging circuitry electrically coupled between the home breaker box panel interface and the EV charging interface, wherein the EV charging circuitry includes switch circuitry for enabling and disabling AC power to the CCS EV charging interface;

a controller electrically coupled with the EV charging circuitry and the DC-to-AC split phase inverter, wherein the controller is configured for;

receiving a grid power failure indication;

determining the battery charge level of the EV;

enabling the DC-to-AC split phase inverter to provide backup power to the transfer switch;

receiving a grid power restored indication; and disabling the DC-to-AC split phase inverter; and implementing Pilot Line management for a charging session and a discharging session without disconnection of the CCS EV charging interface from the EV;

and a user interface electrically coupled with the controller, wherein:

the user interface comprises:

a display configured for indicating a current load of the home based loads and a current charge status of the EV; and a switch configured for:

allowing a user to enable the DC-to-AC split phase inverter to provide backup power to the transfer switch based on the battery charge level of the EV; and allowing the user to disable the DC-to-AC split phase inverter to remove the backup power to the transfer switch.

2. The bidirectional EV charger of claim 1, wherein:

the grid power failure indication is determined from a loss of grid power at a power input interface; and the grid power restored indication is determined from a return of the grid power at the power input interface.

3. The bidirectional EV charger of claim 2, further comprising a communication interface coupled with the controller, wherein the communication interface is configured for providing a remaining power indication based on the battery charge level of the EV.

4. The bidirectional EV charger of claim 3, wherein the communication interface includes an Internet Protocol (IP) network interface configured for sending status information to a remote computing device and receiving commands from the remote computing device.

5. The bidirectional EV charger of claim 4, wherein the remote computing device comprises:

a graphical user interface (GUI); and an application for receiving the status information and sending the commands.

6. The bidirectional EV charger of claim 5, wherein the status information comprises load management information.

7. The bidirectional EV charger of claim 5, wherein:

the communication interface comprises a cellular interface;

the IP network interface is provided by the cellular interface; and the cellular interface is configured for communicating with the remote computing device when the grid power is unavailable.

8. The bidirectional EV charger of claim 3, wherein transfer switch is configured for providing load management based on the remaining power indication.

9. The bidirectional EV charger of claim 1, wherein the bidirectional EV charger in compliance to at least one version of an International Electrotechnical Commission (IEC) 62196 standard.

* * * * *